United States Patent

Swain

[19]

[11] Patent Number: 5,875,955
[45] Date of Patent: Mar. 2, 1999

[54] INTERNALLY MOUNTED PIPE CLAMPING DEVICE

[75] Inventor: Michael A. Swain, Gloucester, Va.

[73] Assignee: Newport News Shipbuilding and Dry Dock Company, Newport News, Va.

[21] Appl. No.: 730,920

[22] Filed: Oct. 18, 1996

[51] Int. Cl.⁶ .................................................. B23K 37/04
[52] U.S. Cl. .......................................... 228/212; 228/214
[58] Field of Search .................................... 228/212, 214, 228/222, 44.5, 49.3, 50; 219/160, 161

[56] References Cited

U.S. PATENT DOCUMENTS

| | | | |
|---|---|---|---|
| 3,469,299 | 9/1969 | Rogers | 29/281.5 |
| 3,960,311 | 6/1976 | Griffiths | 228/50 |
| 4,496,093 | 1/1985 | Taylor, Jr. | 228/44.5 |
| 4,611,743 | 9/1986 | Williams | 219/161 |

Primary Examiner—Samuel M. Heinrich
Attorney, Agent, or Firm—Lloyd A. Ormon; Cliff N. Rosen

[57] ABSTRACT

An internally mounted, portable clamping device for preventing distortion during welding of branch fittings on thin walled pipe. The clamping device comprises a pair of generally arc-shaped clamp halves which are inserted into a pipe and engaged by a screw inserted through a branch fitting which has been tack-welded to the outer surface of the pipe. Turning the screw in one direction moves the clamp halves radially apart until they engage and apply a radially tensive force on portions of the inner surface of the pipe immediately adjacent and opposite the fitting, thereby preventing the pipe from distorting during finish-welding of the fitting. The clamp is disengaged by turning the screw in the opposite direction.

14 Claims, 2 Drawing Sheets

INTERNALLY MOUNTED PIPE CLAMPING DEVICE

FIELD OF THE INVENTION

This invention is a tool for fitting and welding thin walled piping. More particularly it is a portable, internally mounted pipe clamping device for preventing distortion in pipes caused by the heat of welding fittings and branch pipes onto a main pipe.

BACKGROUND OF THE INVENTION

For years pipe fitters have been frustrated with the problem of weld distortion in thin walled piping systems. This problem has been on the increase in recent years. Quality and cost control measures implemented by suppliers have allowed them to eliminate the extra wall thickness on pipes that was formerly characteristic of such pipe and that was expected by fitters. Thinner walls means that the ends of pipes have a tendency to be drawn toward the weld area resulting in curvature of the pipe in the longitudinal direction. That is, the heat from welding fittings and branch pipes onto the main pipe can cause it to become distorted in shape, thus necessitating rework due to improper fitup of the ends.

SUMMARY OF THE INVENTION

The internal pipe clamp of the present invention assists pipe fitters when final welding branch fittings to short lengths of a main pipe by preventing the heat of the welding operation from distorting the shape of the pipe. The internally mounted pipe clamp is installed in a main pipe prior to finish-welding a branch fitting or pipe which has been tack-welded to the main pipe. The clamp holds the shape of the pipe during welding and provides sufficient mass to act as a heat sink to dissipate heat away from the weld area. This decreases the tendency for the main pipe to distort. The simplicity and efficiency of this invention will be more readily understood from a reading of the specification and drawings.

DETAILED DESCRIPTION

Figure 1:
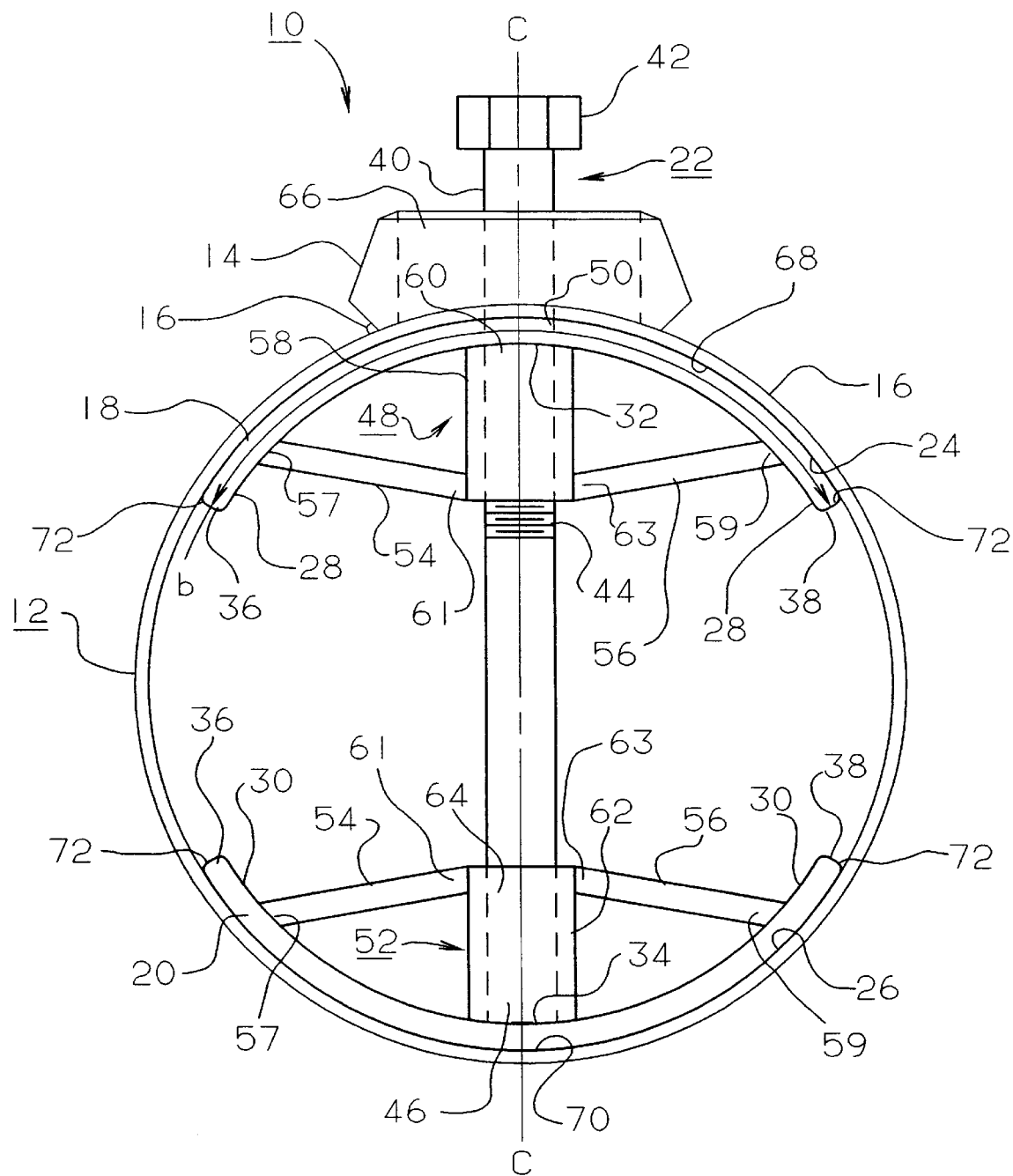
FIG. 1 is a plan view of the preferred embodiment of the present invention inserted into a pipe.

Referring to the drawings, and particularly FIG. 1, the portable, internally mounted pipe clamp of the present invention is generally indicated by numeral 10 and is inserted into a main pipe 12 having a branch fitting 14, for example a welding outlet as shown in FIG. 1 or a pipe (not shown), tack-welded at 16 to an outside surface of the pipe 12.

Figure 2:
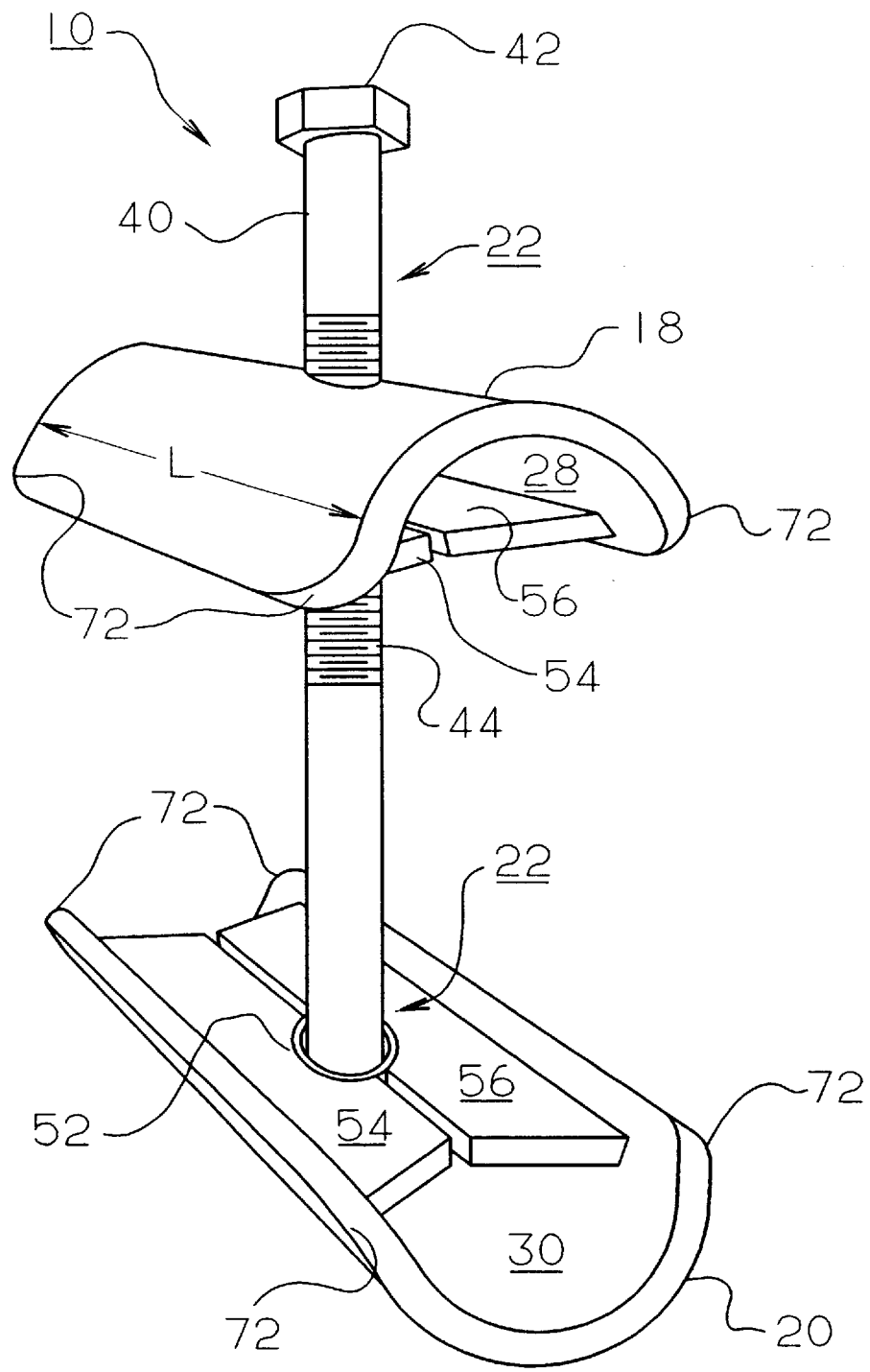
FIG. 2 is an isometric view of the preferred embodiment of the present invention.

Pipe clamp 10 comprises a first clamp half 18, a second clamp half 20, and moving means 22 for moving clamp halves 18,20 relative to each other. In the preferred embodiment, first and second clamp halves 18,20 are of generally similar construction having the shape in transverse cross section of an arc of a circle and comprising a longitudinal length L (shown in FIG. 2), curved outer surfaces 24,26, curved inner surfaces 28,30, centers 32,34, and outer edges 36,38. Clamp halves 18,20 may be of any other shape, so long as the outer surfaces 24,26 are generally parallel to the inner surface 39 of pipe 12. In the preferred embodiment, clamp halves 18,20 are fabricated by being cut from a steel pipe having an outside diameter equal to the inside diameter of pipe 12, but they may be rolled, cast or molded from steel, aluminum, or other materials. Moving means 22 comprises a screw 40 having a head 42, a central axis, at least a partially threaded shank 44, and free end 46, a first screw receiving means 48 mounted at the center 32 of first clamp half 18, an opening 50 at the center 32, and a second screw receiving means 52 mounted at the center 34 of second clamp half 20.

First and second clamp halves 18,20 further each include a pair of strengthening gussets 54,56 which are connected on their outer edges 57,59 to inner surfaces 28,30 adjacent edges 36,38, and on their inner edges 61,63 to screw receiving means 48,52 located at the centers 32,34 of clamp halves 18,20. Gussets 54,56 provide additional stiffening to clamp halves 18,20 to counteract the compressive and tensile forces exerted on the clamp halves 18,20 by main pipe 12 as it tries to distort during final welding of branch fitting 14. Each pair of gussets 54,56 is connected to clamp halves 18,20 substantially over a length equal to or slightly less than longitudinal length L.

Clamp halves 18,20 are generally chosen such that they have a wall thickness that is substantially greater than the wall thickness of the main pipe 12. The wall thickness of clamp halves 18,20 is generally three or more times that of main pipe 12 to provide a substantially greater mass than that of the heat affected zone (an area approximately $\frac{1}{16}$" to $\frac{1}{2}$" adjacent to the fusion area of the weld) of main pipe 12 during finish-welding of branch fitting 14. The greater mass of clamp halves 18,20 provides a strong support for keeping main pipe 12 from distorting during finish-welding, and for dissipating heat from the heat affected zone of main pipe 12, thereby reducing the tendency for main pipe 12 to distort. Clamp halves 18,20 each have an arc length b (shown for first clamp half 18 in FIG. 1) which extends beyond the heat affected zone in the transverse direction and a longitudinal length L which extends beyond the heat affected zone in the longitudinal direction on main pipe 12. In the preferred embodiment of the invention, at least first clamp half 18 has an arc length b between 100° to 180° and a longitudinal length extending at least 1" but preferably about 2" beyond the heat affected zone.

First screw receiving means 48 comprises a socket 58 connected at its outer end to the center 32 of first clamp half 18 and at its inner end to the inner edges 61,63 of gussets 54,56 as noted above. Socket 58 has an internal passage 60 at least partially threaded and in communication with opening 50 disposed in the center 32 of clamp half 18.

Similarly, second screw receiving means 52 may comprise a socket 62 connected on its outer end to the center 34 of second clamp half 20 and on its inner end to the inner edges 61,63 of gussets 54,56 as noted. Socket 62 has an internal passage 64 slightly larger than the diameter of screw 40 which allows second screw receiving means 52 to receive and retain the free end 46 of screw 40 as it is rotated. Alternately, in an embodiment not shown, the free end 46 of screw 40 could be bored out and disposable over a stud fastened to the inner surface of second clamp half 20.

When assembled as shown in FIG. 1, head 42 of screw 40 protrudes through central passage 66 of branch fitting 14. Threaded shank 44 is disposed in screw receiving means 48 and threadably engaged with internal passage 60. Free end 46 is retained in screw receiving means 52. Screw 40 is generally perpendicular to the outer surfaces 24,26 at the centers 32,34 of clamp halves 18,20.

The operation of the present invention will now be described in the environment of a pipe fabrication operation. Standard equipment and procedures are mentioned but not described in detail herein as they are well known in the art.

Prior to using the clamping device of the present invention, a pipe fitter will have fit up a pipe detail in preparation for final welding. A pipe detail may be a single, relatively short piece of pipe having a single branch fitting tack-welded to a wall of the pipe, but may be several short lengths of pipe welded together along with several branch fittings tack-welded to it. A branch fitting may be any of a number of fittings such as a welding outlet, a boss, or a branch pipe. The central axis C—C of the fitting (see FIG. 1 where the fitting is a weld outlet 14) is aligned with an opening in the pipe wall such that the central passage of the fitting is in communication with the opening.

In preparation for finish-welding a particular branch fitting such as branch fitting 14 shown in FIG. 1 using the device of the present invention, first and second clamp halves 18,20 are positioned in opposing relationship relative to each other and inserted through one end of the pipe or pipe detail 12 into a position where the outside surface of first clamp half 18 is facing the opening in the pipe. The centers of clamp halves 18,20 are aligned with the central axis of the branch fitting and screw 40 is inserted through the central passage of the branch fitting and at least partially into first screw receiving means 48 of first clamp half 18. The head 42 of screw 40 is rotated, threadably engaging screw receiving means 48, and disposing the free end 46 of screw 40 into second screw receiving means 52.

Screw 40 is then further rotated forcing clamp halves 18,20 to move away from each other radially within pipe 12 along the central axis of screw 40 until they engage the portions 68,70 of the inner surface of pipe 12 adjacent to and opposite branch fitting 14. The outer edges 36,38 of clamp halves 18,20 are rounded 72 to prevent the clamps from damaging the inner surfaces 68,70 of pipe 12. As first and second clamp halves 18,20 engage opposite portions 68,70 of the inner surface of pipe 12, they exert a radially tensive force on pipe 12. This maintains the shape of pipe 12 and provides a heat sink to dissipate heat from the heat affected zone during subsequent finish-welding of branch fitting 14 to pipe 12.

The foregoing description of my invention should be limited only by the scope of the appended claims in which I claim:

1. A method of preventing distortion of pipe during welding of branch fittings comprising the steps of:
   providing first and second clamp halves, each said clamp half having a center, and an outer surface generally parallel to an inner surface of said pipe;
   providing a means for moving said first and second clamp halves relative to each other along a central axis of said moving means;
   inserting said clamp halves into said pipe; and
   operating said moving means to move said clamp halves apart radially and into contact with said inner surface of said pipe.

2. A method as in claim 1, wherein, the step of providing said moving means further includes the steps of:
   providing a screw with a head, a shank at least partially threaded, and a free end;
   providing first and second screw receiving means mounted at said centers of said first and said second clamp halves, respectively; and
   providing an opening in said center of said first clamp half to receive said shank of said screw.

3. A method as in claim 1, further including the steps of:
   providing said first and second clamp halves each with a pair of gussets; and
   connecting each said pair of gussets along an outer edge to an inner surface of said clamp halves and along an inner edge to said first and second screw receiving means, respectively.

4. A method as in claim 3, further including the step of:
   connecting said outer edges of said gussets to said inner surfaces over a length substantially equal to or slightly less than said longitudinal length of said clamp halves.

5. A method as in claim 2, wherein said step of providing said first screw receiving means includes the steps of:
   providing a socket having an internal passage disposed therein for receiving said screw, said internal passage being at least partially threaded; and
   connecting said socket at one end to said curved inner surface of said first clamp half at said center.

6. A method as in claim 2, wherein said step of providing said second screw receiving means includes the steps of:
   providing a socket having an internal passage disposed therein for receiving and retaining said free end of said screw, said internal passage being slightly larger than a diameter of said screw; and
   connecting said socket at one end to said curved inner surface of said second clamp half at said center.

7. A method as in claim 1, further including the step of:
   constructing said first and second clamp halves with a longitudinal length, wherein, said longitudinal length of at least said first clamp half extends beyond a heat affected zone on said pipe when said branch fitting is finish-welded to an outer wall of said pipe.

8. A method as in claim 7, further including the step of:
   providing said first and second clamp halves with said longitudinal length of at least said first clamp half extending at least 1" beyond said heat affected zone.

9. A method as in claim 1, further including the step of:
   providing first and second clamp halves each of an arc length in the range of 100° to 180°.

10. A method as in claim 1, further including the step of:
    providing first and second clamp halves further comprising outer edges; and
    rounding said outer edges to prevent damage to said inner surfaces of said pipe.

11. A method as in claim 7 further including the step of:
    constructing said first and second clamp halves with a wall thickness substantially greater than a wall thickness of said pipe.

12. A method as in claim 11 further including the step of:
    constructing said first and second clamp halves with a wall thickness at least three times said wall thickness of said pipe.

13. A method as in claim 12 further including the step of:
    dissipating heat from said heat affected zone of said pipe through said first clamp half as said branch fitting is finish-welded to said pipe.

14. A method of preventing distortion of a pipe during welding of branch fittings comprising the steps of:
    providing first and second clamp halves having a shape in transverse cross section of an arc of a circle, each said clamp half having a center, outer edges, a curved inner surface, a curved outer surface, and a longitudinal length;
    providing first and second screw receiving means mounted at said centers of said first and said second clamp halves, respectively;

positioning said first and second clamp halves in opposing relationship relative to each other;

inserting said opposing first and said second clamp halves into a pipe, said pipe further having a branch fitting tack-welded to an outer wall of said pipe, said branch fitting having a central passage and a central axis through said passage, said pipe further having an opening disposed in said wall, said opening being aligned with said central axis and in communication with said central passage in said branch fitting;

aligning said centers of said clamp halves with said central axis of said branch fitting;

providing a means for moving said first and second clamp halves relative to each other radially within said pipe, said moving means comprising a screw having a head, a free end, and a threaded shank therebetween;

inserting said free end of said screw through said central passage of said branch fitting, said opening disposed in said wall of said pipe, and at least partially into said first screw receiving means, said screw being perpendicular to said outer surfaces of said clamp halves at said centers;

rotating said head of said screw until said shank threadably engages said first screw receiving means and said free end is disposed in said second screw receiving means; and further rotating said head until said curved outer surface of said first clamp half engages a first portion of said inner surface of said pipe adjacent said branch fitting and said curved outer surface of said second clamp half engages a second portion of said inner surface of said pipe opposite said first portion, said first and said second clamp halves applying a radially tensive force on said first and said second portions of said inner surface of said pipe.

* * * * *